United States Patent
Zhou et al.

(10) Patent No.: US 8,811,342 B2
(45) Date of Patent: Aug. 19, 2014

(54) METHOD AND SYSTEM FOR DELETING REDUNDANT INFORMATION OF HOME POLICY AND CHARGING RULES FUNCTION

(75) Inventors: Xiaoyun Zhou, Guangdong Province (CN); Tong Rui, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 346 days.

(21) Appl. No.: 13/257,722

(22) PCT Filed: Oct. 27, 2009

(86) PCT No.: PCT/CN2009/074641
§ 371 (c)(1),
(2), (4) Date: Dec. 30, 2011

(87) PCT Pub. No.: WO2011/006317
PCT Pub. Date: Jan. 20, 2011

(65) Prior Publication Data
US 2012/0106508 A1    May 3, 2012

(30) Foreign Application Priority Data

Jul. 17, 2009   (CN) .......................... 2009 1 0157944

(51) Int. Cl.
*H04W 4/00*      (2009.01)
*H04L 12/16*     (2006.01)
*H04W 28/06*     (2009.01)
*H04W 4/24*      (2009.01)
*H04M 15/00*     (2006.01)
*H04W 88/16*     (2009.01)
*H04W 76/06*     (2009.01)

(52) U.S. Cl.
CPC .............. *H04W 28/06* (2013.01); *H04W 88/16* (2013.01); *H04W 76/06* (2013.01); *H04W 4/24* (2013.01); *H04M 15/66* (2013.01); *H04M 15/80* (2013.01); *H04M 15/70* (2013.01); *H04M 15/8038* (2013.01); *H04M 15/00* (2013.01)
USPC ........................... 370/331; 370/236; 370/341

(58) Field of Classification Search
USPC ........................................................ 370/331
See application file for complete search history.

(56) References Cited

U.S. PATENT DOCUMENTS

2008/0046963 A1* 2/2008 Grayson et al. ................... 726/1
2008/0052258 A1* 2/2008 Wang et al. ..................... 706/46
(Continued)

FOREIGN PATENT DOCUMENTS

CN          101217383 A     7/2008
CN          101355806 A  *  1/2009

OTHER PUBLICATIONS

3GPP TS 29.215 v8.0.2, Policy and Charging Control (PCC) over S9 reference point; Jan. 31, 2009.
(Continued)

*Primary Examiner* — Noel Beharry
*Assistant Examiner* — Joe Combs
(74) *Attorney, Agent, or Firm* — Ling Wu; Stephen Yang; Ling and Yang Intellectual Property (57) ABSTRACT

The present invention discloses a method and a system for deleting redundant information of a home Policy and Charging Rule Function (PCRF). The Bearer Binding and Event Report Function (BBERF) in a visited network indicates gateway control session termination to the home PCRF through a visited PCRF after receiving a termination session triggering for determining to terminate a gateway control session between the BBERF in the visited network and the visited PCRF, and the home PCRF deletes policy control information related to the BBERF in the visited network. With the method of the present invention, the invalid session information in the home PCRF is cleared in time, which eliminates the redundancy of the home network resources and saves the home network resources.

13 Claims, 9 Drawing Sheets

(56) References Cited

U.S. PATENT DOCUMENTS

| | | | |
|---|---|---|---|
| 2008/0229385 A1* | 9/2008 | Feder et al. | 726/1 |
| 2008/0254768 A1* | 10/2008 | Faccin | 455/411 |
| 2008/0320149 A1* | 12/2008 | Faccin | 709/228 |
| 2009/0300207 A1* | 12/2009 | Giaretta et al. | 709/232 |
| 2009/0318147 A1* | 12/2009 | Zhang et al. | 455/435.1 |
| 2010/0144334 A1* | 6/2010 | Gorokhov et al. | 455/418 |
| 2010/0146131 A1* | 6/2010 | Hu et al. | 709/228 |
| 2010/0177780 A1* | 7/2010 | Ophir et al. | 370/401 |
| 2010/0180319 A1* | 7/2010 | Hu et al. | 726/1 |
| 2010/0291923 A1* | 11/2010 | Zhou et al. | 455/432.1 |
| 2011/0007748 A1* | 1/2011 | Yin et al. | 370/401 |
| 2011/0022722 A1* | 1/2011 | Castellanos Zamora et al. | 709/235 |
| 2011/0058523 A1* | 3/2011 | Manning et al. | 370/329 |
| 2011/0065435 A1* | 3/2011 | Pancorbo Marcos et al. | 455/436 |
| 2011/0138005 A1* | 6/2011 | Zhou et al. | 709/206 |
| 2011/0170411 A1* | 7/2011 | Wang et al. | 370/235 |
| 2011/0173332 A1* | 7/2011 | Li et al. | 709/227 |
| 2011/0202647 A1* | 8/2011 | Jin et al. | 709/223 |
| 2011/0222399 A1* | 9/2011 | Shi et al. | 370/230 |
| 2011/0256856 A1* | 10/2011 | Rydneil et al. | 455/418 |
| 2011/0286384 A1* | 11/2011 | Sugimoto et al. | 370/328 |
| 2012/0005356 A1* | 1/2012 | Hellgren | 709/229 |
| 2012/0021741 A1* | 1/2012 | Pancorbo Marcos et al. | 455/433 |
| 2012/0059944 A1* | 3/2012 | Fernandez Alonso et al. | 709/228 |
| 2012/0064878 A1* | 3/2012 | Castro Castro et al. | 455/418 |
| 2012/0144049 A1* | 6/2012 | Lopez Nieto et al. | 709/228 |
| 2012/0176894 A1* | 7/2012 | Cai et al. | 370/230 |
| 2012/0210003 A1* | 8/2012 | Castro et al. | 709/225 |
| 2012/0216249 A1* | 8/2012 | Fernandez Alonso et al. | 726/1 |
| 2012/0226814 A1* | 9/2012 | Stucker | 709/227 |
| 2014/0105223 A1* | 4/2014 | Castellanos Zamora et al. | 370/458 |

OTHER PUBLICATIONS

3GPP TS 29.212 v8.2.0, Policy and Charging Control over Gx reference point; Dec. 31, 2008.

International Search Report for PCT/CN2009/074641 dated Mar. 30, 2010.

* cited by examiner

METHOD AND SYSTEM FOR DELETING REDUNDANT INFORMATION OF HOME POLICY AND CHARGING RULES FUNCTION

TECHNICAL FIELD

The present invention relates to a technique of the IP Connectivity Access Network (IP-CAN) session, and more especially, to a method and system for deleting redundant information of a home policy and charging rules function in a roaming scenario.

BACKGROUND OF THE RELATED ART

Figure 1:
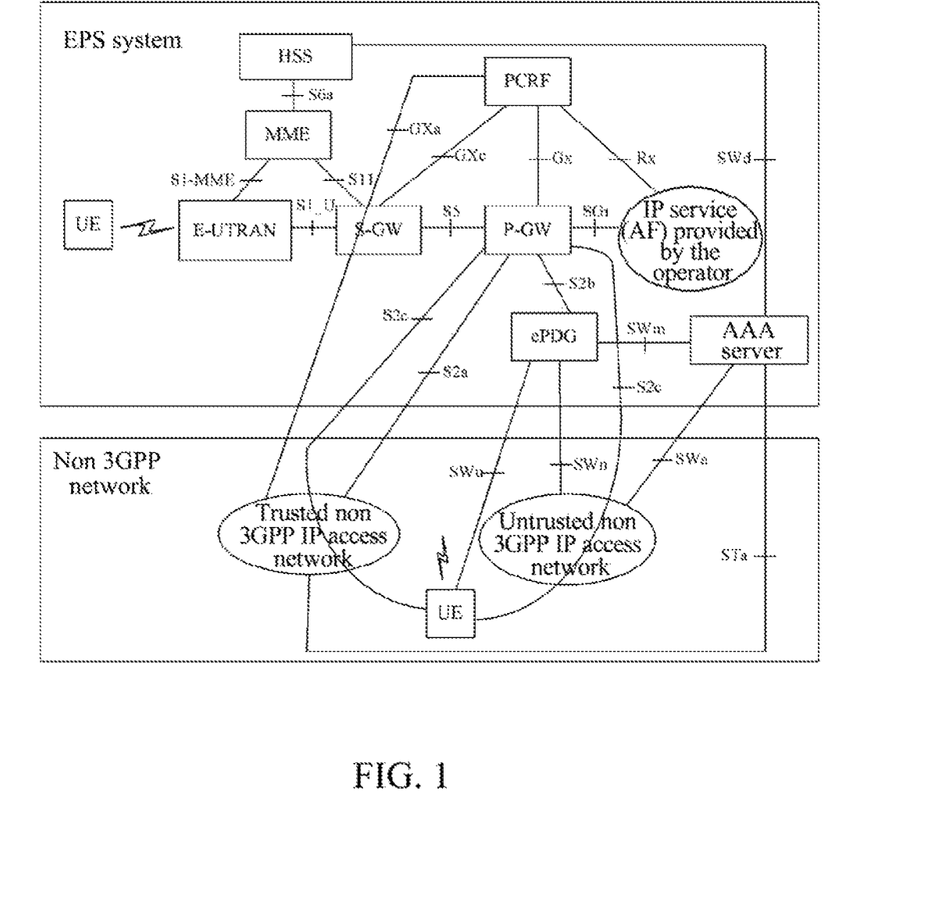
FIG. 1 is a composition schematic diagram of the system architecture of the EPS in the related art.

FIG. 1 is a composition schematic diagram of the system architecture of the Evolved Packet System (EPS) in the related art, and as shown in FIG. 1, the EPS of the 3rd Generation Partnership Project (3GPP) comprises: an Evolved Universal Terrestrial Radio Access Network (E-UTRAN), a Mobility Management Entity (MME), a Serving Gateway (S-GW), a Packet Data Network Gateway (P-GW), a Home Subscriber Server (HSS), a 3GPP Authentication Authorization Accounting (AAA), a Policy and Charging Rules Function (PCRF) and other support nodes.

The MME is for related works of the control plane such as mobility management, non-access stratum signaling processing and user mobility management context management and so on; the S-GW is an access gateway device connected with the E-UTRAN, and is used to forward data between the E-UTRAN and P-GW and is responsible for caching the paging waiting data; and the P-GW is a border gateway between the EPS and Packet Data Network (PDN), and is responsible for functions such as accessing the PDN and forwarding data between the EPS and PDN and so on.

As shown in FIG. 1, the EPS supports interconnection with a non 3GPP network and implements the interconnection with the non 3GPP network through S2a/b/c interfaces. The non 3GPP network includes a trusted non 3GPP network and an untrusted non 3GPP network, wherein the IP access of the trusted non 3GPP network can be directly connected with the P-GW through the S2a; and the IP access of the untrusted non 3GPP network needs to be connected with the P-GW through the Evolved Packet Data Gateway (ePDG), and the interface between the ePDG and P-GW is the S2b. UE can also be connected with the P-GW through the S2c interface adopting the DSMIPv6 protocol.

If the EPS system supports that the PCRF of the Policy and Charging Control (PCC) makes the policy and charging rules, then the EPS system connects with the Internet Protocol (IP) service network of the operator through the receiving interface Rx and obtains the service information; furthermore, the EPS system connects with the gateway device in the network through Gx/Gxa/Gxc interfaces, and is responsible for initiating the IP bearer establishment, ensures the Quality of Service (QoS) of the service data, and performs charging control.

The Policy and Charging Enforcement Function (PCEF) is located in the P-GW, and the PCRF and the P-GW exchange information via the Gx interface. When the interface between the P-GW and the S-GW is based on the Proxy Mobile IP (PMIP), the S-GW has a Bearer Binding and Event Report Function (BBERF), and the S-GW and the PCRF exchange information via the Gxc interface. When a trusted non 3GPP network is accessed, a BBERF also resides in the trusted non 3GPP access gateway, and the trusted non 3GPP access gateway and the PCRF exchange information via the Gxa interface. When the User Equipment (UE) is roaming, the interface between the home PCRF and the visited PCRF is the S9 interface, meanwhile, the Application Function (AF) which provides a service for the UE is located in the service network, and sends the service information used to generate the PCC policy to the PCRF through the Rx interface.

Figure 2:
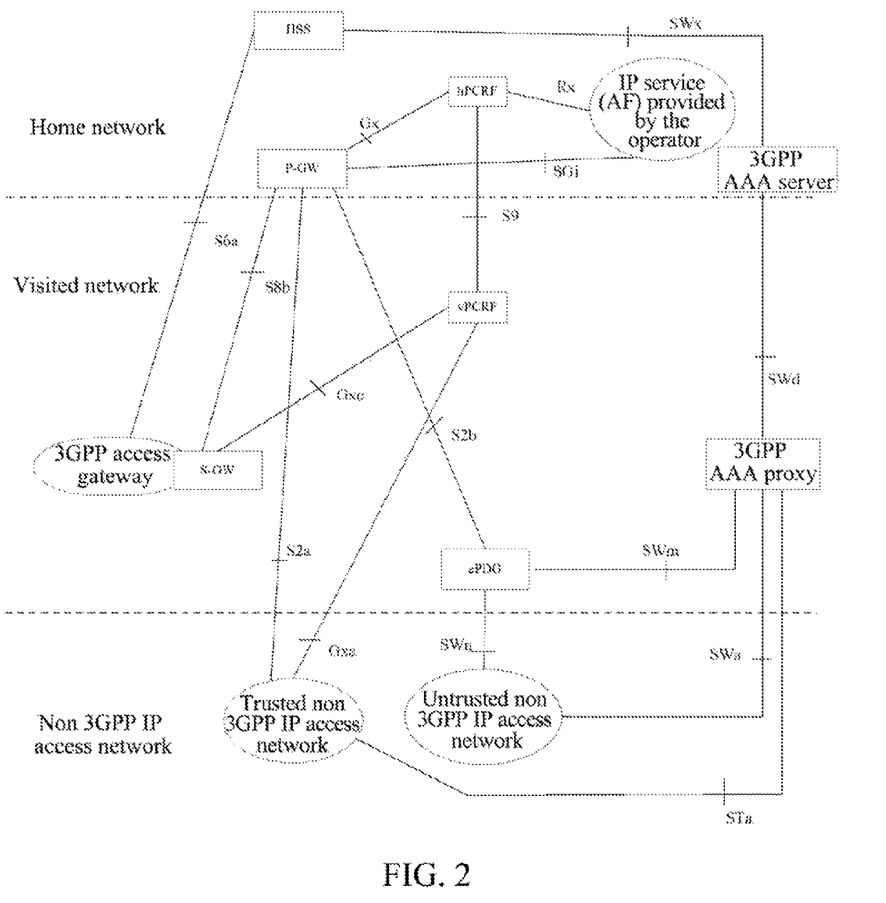
FIG. 2 is a schematic diagram of one kind of roaming architecture in the EPS system in the related art.
Figure 3:
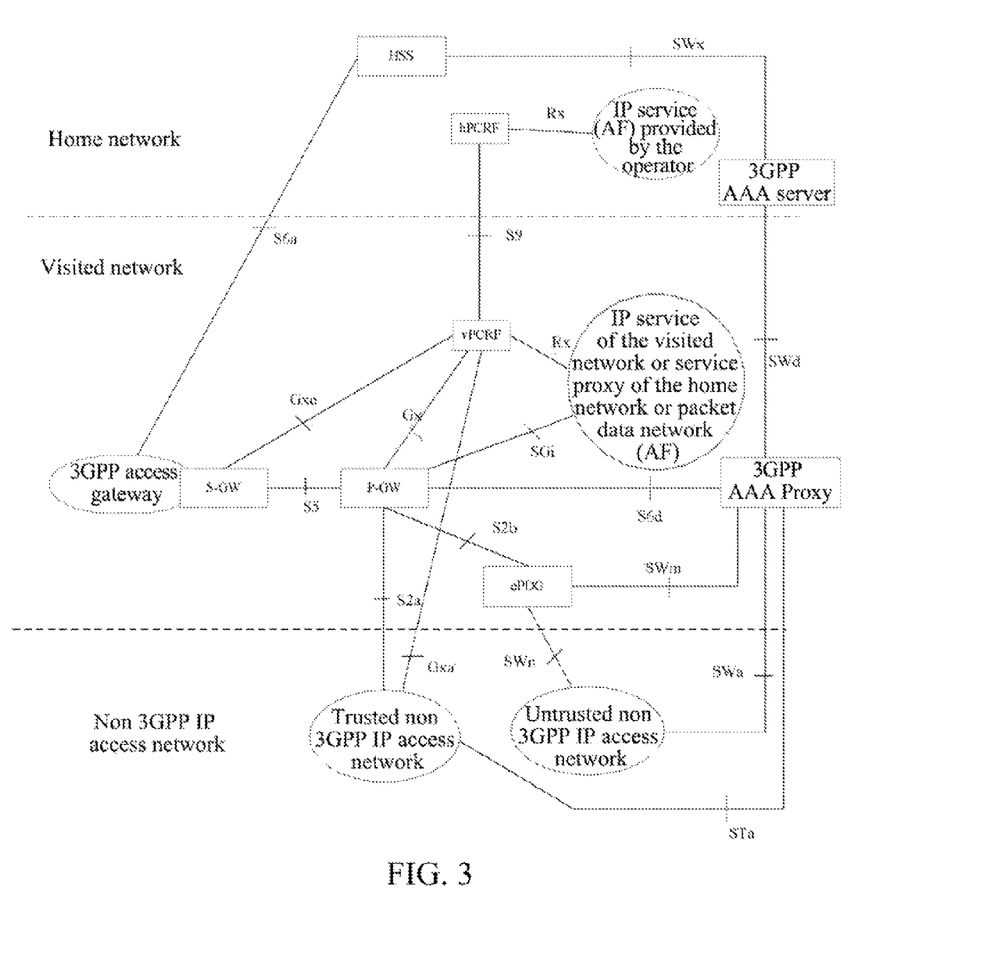
FIG. 3 is a schematic diagram of another kind of roaming architecture in the EPS system in the related art.

The EPS has two kinds of roaming architecture, and FIG. 2 is a schematic diagram of one kind of roaming architecture in the EPS system in the related art. FIG. 2 shows home routed, that is to say, the P-GW is located in the home network and the IP service is provided by the operators of the home network (that is, the AF is in the home network);

FIG. 3 is a schematic diagram of another kind of roaming architecture in the EPS system in the related art, and FIG. 3 shows the local breakout, that is to say, the P-GW is located in the visited network, and the IP service can be provided by the operators of the home network or by the operators of the visited network can provide a IP service. For different roaming scenarios, the processes of the PCC are different, and the functions enforced by the PCC network elements are also different.

The EPS system supports multiple PDNs access, and the UE can access multiple PDNs by one or more P-GWs at the same time, that is, one UE can have multiple PDN connections at the same time. Generally, one connection from the UE to the PDN network is called as one IP-CAN session, that is to say, the EPS supports that the UE is able to have a plurality of IP-CAN sessions simultaneously.

In the related art, the protocol adopted in the PCC architecture is a Diameter application protocol developed on the basis of the Diameter Base Protocol, such as the application protocol applied in the Gx interface, the application protocol applied in the Rx interface, the application protocol applied in the Gxx interface (including the Gxa and Gxc interfaces) and the application protocol applied in the roaming interface S9 and so on. These application protocols define the messages, commands and Attribute Value Pairs (AVP), etc. used for the PCC. The Diameter sessions which are established by these protocols can become a Gx session, a Gxx session, an Rx session and an S9 session respectively. Each function entity of the PCC performs policy and charging control on the PDN connection established for the UE accessing the network through these sessions. The PCC architecture has defined the Diameter application protocols which are used in a non roaming scenario at present, such as the application protocol applied in the Gx interface, the application protocol applied in the Rx interface and the application protocol applied in the Gxx interface (including the Gxa and Gxc interfaces) and so on. These protocols define the messages, commands and AVP, etc. used for the PCC.

In the related art, one IP-CAN session relates to multiple network elements. In order to obtain the policy control rules for controlling this IP-CAN session or provide the information for establishing the policy control rules, each network element will establish a Diameter session with the PCRF respectively. Thus, one IP-CAN session will be associated with multiple Diameter sessions, and these Diameter sessions are all established, maintained and deleted by adopting the Diameter protocol.

At present, the scheme of implementing an S9 roaming interface is that: for each UE, the vPCRF terminates the Gx session and Gxx session existing in the visited network of all the IP-CAN sessions established by the UE, and uses one S9 session to transmit the information in the Gx session and Gxx session of all the IP-CAN sessions without terminating the Rx session in the visited network of all the IP-CAN sessions, and just forwards the messages of the Rx session to the home PCRF (hPCRF), and takes the visited PCRF (vPCRF) as one proxy. One S9 session probably has multiple subsessions, which are called as the S9 subsessions. Each subsession is used to transmit the information in the Gx session and Gxx session of one IP-CAN session.

When the BBERF relocation occurs, such as when the UE performs an inter-system handover or an inter-system pre-registration and so on, the PCRF needs to control two or more BBERFs located in different systems at the same time, wherein one is called as the Primary BBERF, and the others are called as the Non-Primary BBERF. The PCRF saves the QoS rules and states of BBERFs for each BBERF respectively at the same time, and the operations on these BBERFs are also different. For example, when the PCRF needs to update the QoS rules, the hPCRF will send the updated QoS rules to these BBERF at the same time, if the Primary BBERF can not successfully install the QoS rules, the Primary BBERF will report the situation to the hPCRF, and the hPCRF will delete the same QoS rules in the Non-Primary BBERFs, and also delete the corresponding PCC rules in the PCEF. If the Non-Primary BBERF can not successfully install the QoS rules, the Primary BBERF will report the situation to the hPCRF, and then the PCRF just updates the QoS rules and states which are saved for the Non-Primary BBERF in the PCRF without carrying out the other operations. Of course, there are other different operations performed by the hPCRF with respect to the Primary BBERF and Non-Primary BBERF, which will not be repeated here.

Figure 4:
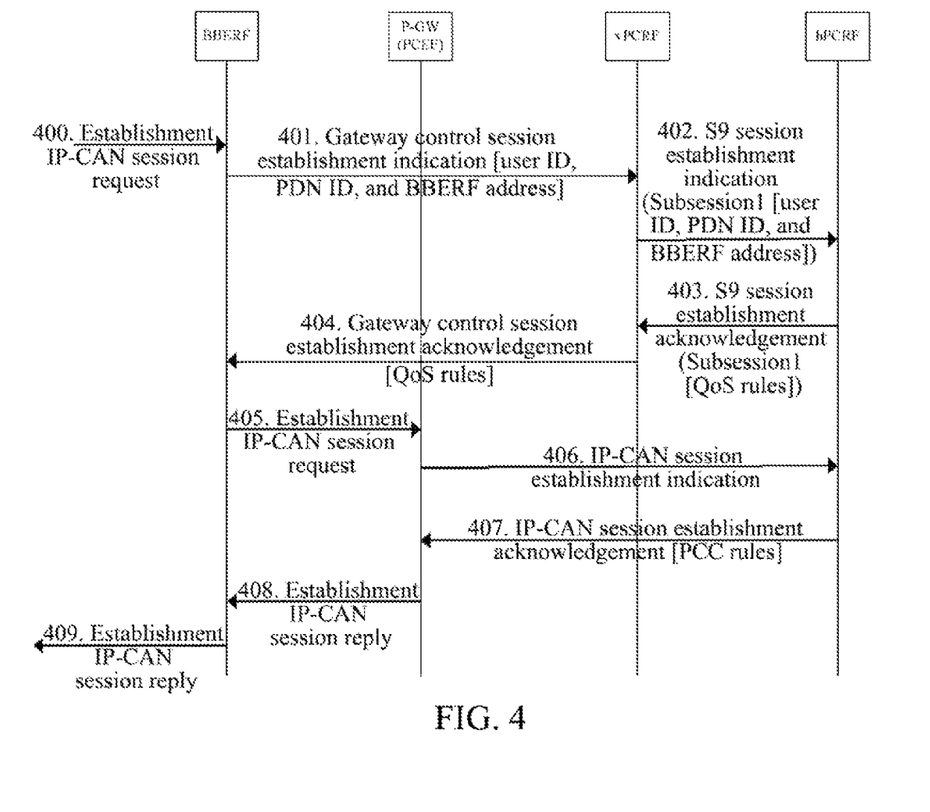
FIG. 4 is a flow chart of establishing the IP-CAN session of the UE accessing the EPS through the E-UTRAN or trusted non 3GPP access gateway in the roaming scenario of the home routed in the related art.

FIG. 4 is a flow chart of establishing the IP-CAN session of the UE accessing the EPS through the E-UTRAN or trusted non 3GPP access gateway in the roaming scenario of the home routed in the related art, and it is assumed that the PMIPv6 protocol is adopted between the S-GW and P-GW when accessing the E-UTRAN and the PMIPv6 protocol is adopted between the access gateway and P-GW when accessing the non 3GPP access gateway. As shown in FIG. 4, the following steps are comprised.

Step 400: the BBERF receives an establishment IP-CAN session request message, and obtains a user identity for example a Network Access Identity (NAI), a PDN identity and access information for making a policy, wherein the access information includes the network identity of the network in which the BBERF is located, the current position information of UE, the address of the BBERF and the IP-CAN type or the RAT type and so on.

The BBERF can be located in the S-GW or the trusted non 3GPP access gateway.

Step 401: the BBERF sends a gateway control session establishment indication message to the vPCRF, and the gateway control session establishment indication message includes a user identity, PDN identity and access information for making a policy. The Gxx session established by the gateway control session establishment indication message is called as Gxx session1.

Step 402: the vPCRF sends an S9 session establishment indication message to the hPCRF, and includes the user identity, the PDN identity and the access information for making the policy which are included in the gateway control session establishment indication message in the step 401 into the Subsession1, and further includes Subsession1 into the S9 session establishment indication message to send to the hPCRF. The vPCRF records the association relationship between the Gxx session1 and Subsession1.

In this step, the vPCRF determines that the user is a roaming user according to the user identity, thus determines that the UE adopts a home routed and the hPCRF supports the functions of the Gxx interface according to the PDN identity and roaming agreement. Then, the vPCRF determines an S9 session has not been established for the user by itself, terminates the Gxx session, initiates to establish a new Diameter session namely an S9 session with the hPCRF, and makes a request for establishing a subsession, which is called as Subsession1, in the S9 session.

Step 403: the hPCRF saves the reported access information, and interacts with the user Subscription Profile Repository (SPR) according to the user identity and PDN identity to obtain the subscription information of the UE, and makes the default PCC rules, QoS rules, and event triggers according to the network policy and reported access information, etc. The hPCRF sends an S9 session establishment acknowledgement message to the vPCRF, and the QoS rules and event triggers are included in the Subsession1 and included in the S9 session establishment acknowledgement message.

Step 404: the vPCRF sends a gateway control session establishment acknowledgement message to the BBERF, and the gateway control session establishment acknowledgement message includes the QoS rules and event triggers obtained from the S9 session establishment acknowledgement message so that the BBERF installs the QoS rules and event triggers.

The vPCRF sends the QoS rules and event triggers included in the Subsession 1 to the BBERF by the Gxx session 1 according to the association relationship between the Subsession 1 and Gxx session 1.

The vPCRF can modify the QoS rules and event triggers sent by the hPCRF according to the policy of the visited network, and at the moment, the step 405 sends the modified QoS rules and event triggers so that the BBERF installs the modified QoS rules and event triggers.

Step 405: the gateway in which the BBERF is located sends an establishment IP-CAN session request message to the P-GW, and the establishment IP-CAN session request message includes information such as a NAI identity of the UE, PDN identity, and IP-CAN type or RAT type of the access network and so on. In the implementation, the establishment IP-CAN session request message is a proxy binding update message.

Herein, step 405 can be carried out with step 401 at the same time without waiting for the messages returned by step 404.

Step 406: as the example is the home routed, the P-GW is in a home network. The P-GW allocates an IP address for the UE, and the PCEF which resides in the P-GW sends an IP-CAN session establishment indication message to the hPCRF, and the IP-CAN session establishment indication message includes a user identity, IP address allocated for the UE, PDN identity and access information (the IP-CAN type or RAT type reported in step 405) for making a policy.

The Gx session established by the IP-CAN session establishment indication message is called as Gx session1.

Step 407: the hPCRF associates the Gx session1 with the S9 session established in step 402 according to the user identity, and associates the Gx session1 with the Subsession1 according to the user identity and PDN identity. The hPCRF sends the PCC rules and event triggers made previously to the PCEF by the IP-CAN session establishment acknowledgement message. Since there is only one BBERF at present, the BBERF can be considered as a Primary BBERF. Of course, the hPCRF can determine that the BBERF is a Primary BBERF according to the IP-CAN type or RAT type reported in step 406 is the same as the IP-CAN type or RAT type reported in step 402.

The PCEF installs the sent PCC rules and event triggers after receiving the acknowledgement message, and the hPCRF can also modify the made PCC rules according to the access information for making the policy provided by the PCEF, and thus, the hPCRF sends the modified PCC rules.

Step 408: the P-GW returns an establishment IP-CAN session reply to the gateway in which the BBERF is located. In the implementation, the establishment IP-CAN session reply is a proxy binding update acknowledgement message. The establishment IP-CAN session reply can be initiated without waiting for the acknowledgement message in the step 407.

Step 409: the gateway in which the BBERF is located returns the establishment IP-CAN session reply.

Figure 5:
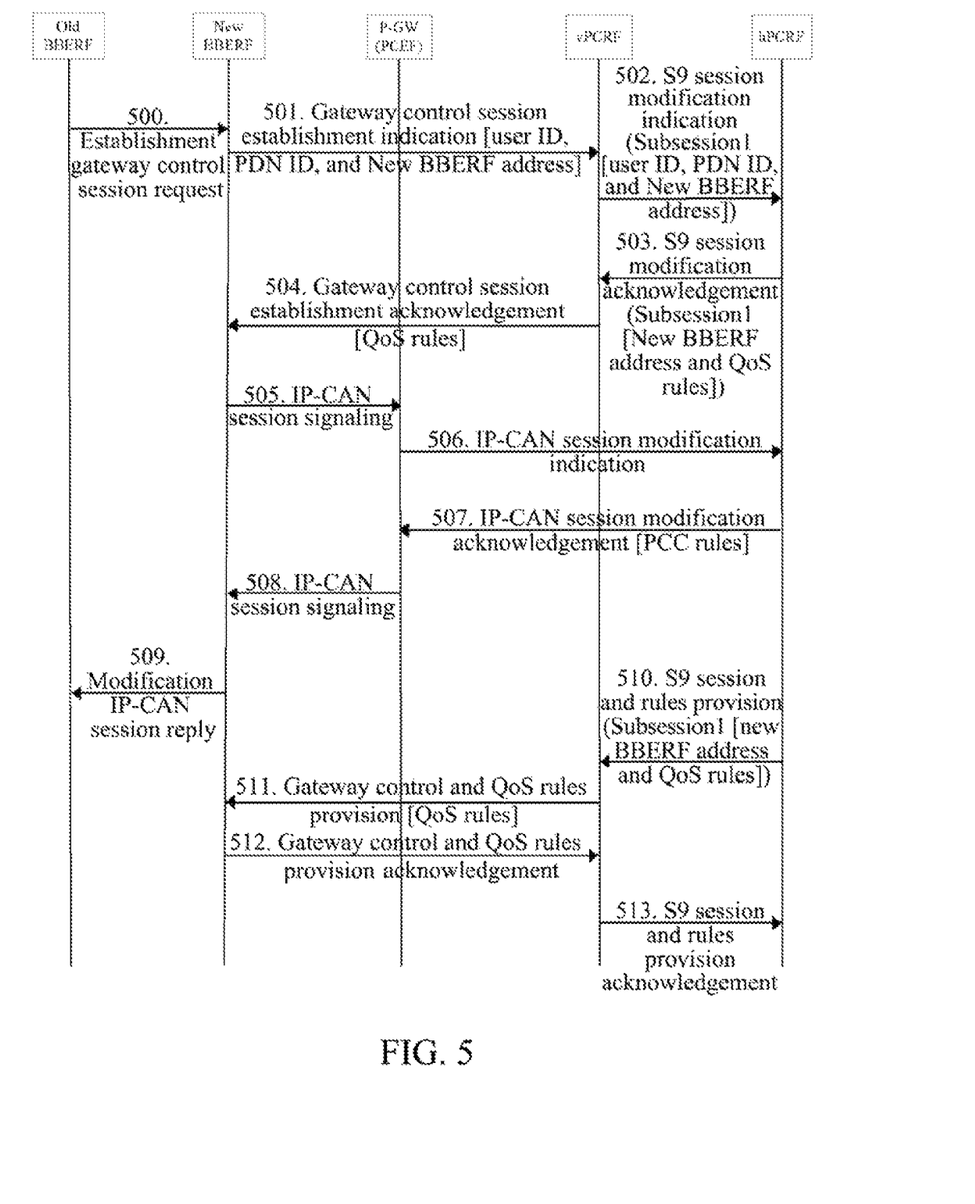
FIG. 5 is a flow chart of modifying the IP-CAN session of the UE accessing the EPS through the E-UTRAN or trusted non 3GPP access gateway in the roaming scenario of the home routed in the related art.

FIG. 5 is a flow chart of modifying the IP-CAN session of the UE accessing the EPS through the E-UTRAN or trusted non 3GPP access gateway in the roaming scenario of the home routed in the related art, and it is assumed that an IP-CAN session modification is caused by the occurrence of the BBERF relocation (e.g. the UE performing handover or inter-system pre-registration) after establishing the IP-CAN session of accessing the EPS as shown in the FIG. 4. And it is assumed that the PMIPv6 protocol is adopted between the S-GW and P-GW when accessing the E-UTRAN and the PMIPv6 protocol is adopted between the access gateway and P-GW when accessing the non 3GPP access gateway. As shown in FIG. 5, the following steps are comprised.

Step 500: the New BBERF receives an establishment IP-CAN session request message, and obtains a user identity, PDN identity and access information for making a policy, etc. And the access information includes the network identity of the New BBERF, the current position information of UE and the IP-CAN type or RAT type of the access network and so on.

Step 501: the New BBERF sends a gateway control session establishment indication message to the vPCRF, and the gateway control session establishment indication message includes a user identity, PDN identity and an access information for making a policy and so on, and the access information includes the network identity of the network in which the New BBERF is located, the current position information of UE, the address of the New BBERF and the IP-CAN type or RAT type of the new access network and so on. The Gxx session established by the gateway control session establishment indication message is represented as Gxx session 2.

Step 502: the vPCRF sends an S9 session modification indication message to the hPCRF to make a request for modifying the Subsession1, and includes the new access information (including the address of the New BBERF and the IP-CAN type or RAT type of the new access network) of the UE into the Subsession1 to send to the hPCRF.

The vPCRF determines that an S9 session has been established for the user according to the user identity, and determines that the UE performs the handover according to the user identity, PDN identity and access network information (e.g. the address of the New BBERF).

The vPCRF associates the Gxx session 2 with the Subsession 1 according to the user identity and PDN identity.

Step 503: the hPCRF sends an S9 session modification acknowledgement message to the vPCRF, and the S9 session modification acknowledgement message includes the Subsession1 which includes the QoS rules, event triggers and the address of the New BBERF, wherein the address of the New BBERF is used to identify that the information such as the QoS rules and event triggers and so on in the Subsession1 of the message is with respect to the New BBERF.

The hPCRF determines the UE performs handover according to the address of the New BBERF is different from the address of the Old BBERF, and re-makes the QoS rules according to the new access information of the UE. At the moment, the hPCRF will determine which BBERF is a Primary BBERF and which BBERF is a Non-primary BBERF. If the IP-CAN type or RAT type of the new access network reported by the New BBERF in step 502 is different from the IP-CAN type or RAT type of the access network reported by the PCEF in step 406 of FIG. 4, then the hPCRF determines that the New BBERF is a Non-Primary BBERF and the Old BBERF is still a Primary BBERF.

Step 504: the vPCRF sends a gateway control session establishment acknowledgement message to the New BBERF, and the gateway control session establishment acknowledgement message includes the new QoS rules. The New BBERF installs the new QoS rules after receiving the gateway control session establishment acknowledgement message.

The vPCRF sends the QoS rules and event triggers in the Subsession1 to the New BBERF through the Gxx session2 according to the address of the New BBERF.

The vPCRF can modify the QoS rules and event triggers according to the policy, and send the modified QoS rules and event triggers to the New BBERF.

From this moment, the hPCRF will carry out different operations for the Primary BBERF and Non-Primary BBERF. The flow of the UE performing inter-system pre-registration ends up to now, and the flow of the handover of the UE continues the following steps.

Step 505: the gateway in which the New BBERF is located sends an IP-CAN session signaling message to the P-GW, and the IP-CAN session signaling message includes the user identity and the PDN identity. In the implementation, the IP-CAN session signaling message is the proxy binding update message of PMIPv6, and the IP-CAN session signaling message include the IP-CAN type or RAT type of the new access network.

Step 506: the PCEF in the P-GW determines the UE performs the handover according to the information such as the user identity and PDN identity and so on, and finds the corresponding context before the UE performing the handover (i.e. the information such as the PCC rules and event triggers and so on), then sends an IP-CAN session modification indication message to the hPCRF through the Gx session1, and the IP-CAN session modification indication message includes the access information after the UE performing the handover, including the IP-CAN type or RAT type of the new access network.

Step 507: the hPCRF determines that the New BBERF is a Primary BBERF and the Old BBERF is a Non-Primary BBERF according to the association relationship among the Gx session1, S9 session and Subsession1, and also according to the access information reported by the Gx session1 and the access information respectively reported by the Gxx session1 and Gxx session 2.

Since the IP-CAN type or RAT type of the new access network reported by the PCEF in step 506 is the same as the IP-CAN type or RAT type of the access network reported by the New BBERF in step 502 at the moment, the hPCRF determines the New BBERF is a Primary BBERF and the Old BBERF is a Non-Primary BBERF. The hPCRF re-makes the PCC rules, QoS rules and event triggers according to the access information reported by the New BBERF, user subscription data and network policies and so on, and returns the IP-CAN session modification indication acknowledgement message to the PCEF, wherein the IP-CAN session modification indication acknowledgement message includes the updated PCC rules and event triggers.

Step 508: the P-GW returns the IP-CAN session signaling message to the gateway in which the New BBERF is located.

In the implementation, the IP-CAN session signaling message is a proxy binding update acknowledgement message.

Step 509: the gateway in which the New BBERF is located returns a modification IP-CAN session reply message.

Step 510: the hPCRF sends the S9 session and QoS rule provision message to the vPCRF, and includes the PCC rules and event triggers updated in step 507 and the address of the New BBERF into the Subsession1 and includes Subsession1 into the S9 session and QoS rule provision message to send to the vPCRF.

Step 511: the vPCRF includes the QoS rules and event triggers in the Subsession 1 into the gateway control and QoS rule provision message to send to the New BBERF through the Gxx session2 according to the address of the New BBERF.

Step 512: the New BBERF installs and enforces the QoS rules and event triggers, and returns the gateway control and QoS rule provision acknowledgement message to the vPCRF.

Step 513: the vPCRF returns the S9 session and QoS rule provision acknowledgement message to the hPCRF.

The hPCRF also sends the updated QoS rules and event triggers to the Old BBERF, and includes the QoS rules, event triggers and the address of the Old BBERF into the Subsession1. The vPCRF decides to send the QoS rules and event triggers to the Old BBERF through the Gxx session1 according to the address of the Old BBERF.

In the process of the occurrence of the BBERF relocation, the hPCRF controls two BBERFs (more than two BBERFs may exist in certain scenarios) at the same time, and performs policy control according to the category of the BBERF (e.g. Primary and Non-Primary). When the BBERF relocation is finished, the Old BBERF needs to inform the hPCRF that its Gxx session in the visited network terminates so that the hPCRF will delete the QoS rules and event triggers and so on which are saved by itself for the Old BBERF (the Old BBERF is a Non-Primary BBERF at the moment). Or, after step 504 of FIG. 5, the New BBERF doesn't send IP-CAN session signaling to the P-GW, but determines to terminate its Gxx session in the visited network, and the vPCRF should also inform the hPCRF to delete the QoS rules and event triggers, etc. which are saved by the hPCRF for the New BBERF (the New BBERF is a Non-Primary BBERF at the moment) similarly. (Especially for inter-system pre-registration of the UE, the flow just needs to be implemented to the step 504.) In the related art, there is not effective methods to solve the problem that when the Non-Primary BBERF in the visited network terminates the gateway control session between itself and the visited PCRF under a roaming scenario, the invalid session information in the home PCRF can not be cleared in time, which leads to a redundancy and waste of the home network resources.

For a roaming scenario of the local breakout, those skilled in the art can easily find out that the above problem also exists in the case that the hPCRF needs to control the BBERF in the visited network.

Similar problems also exist in a multiple access scenario, and the multiple accesses are a technique that the EPC supports the UE to access one PDN simultaneously through the same one P-GW through multiple access networks.

Figure 6:
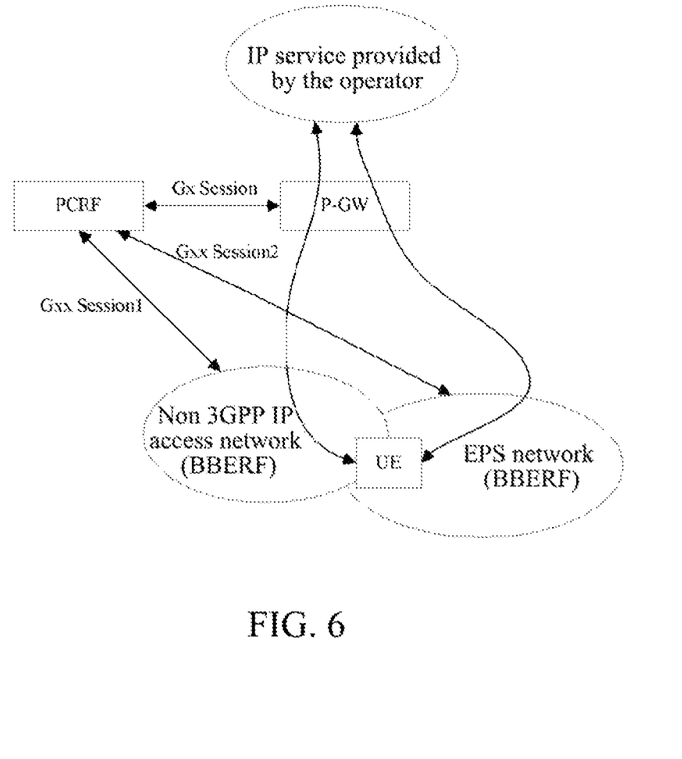
FIG. 6 is a schematic diagram of the multiple access scenario.

FIG. 6 is a schematic diagram of the multiple access scenario, and as shown in FIG. 6, the UE is in the coverage of the non 3GPP IP access network and the 3GPP access network (i.e. the EPS network) at the same time, and the non 3GPP IP access network and 3GPP access network access the PDN through the same one P-GW. In this scenario, the UE attach to the EPS through multiple access networks, the P-GW allocates an IP address for the UE, and a PDN connection exists between the UE and the PDN. As different services adapt to adopt different network transmissions, the multiple access technique can choose an applicable access networks to transmit services according to the features of the services, and the multiple access networks can share the network loads so as to avoid network congestion. If the non 3GPP access network is WiFi, the service data streams of the Http and Ftp can be sent to the UE through the WiFi access network and the service data streams of the VoIP can be sent to the UE through the 3GPP. In this scenario, the PCRF also needs to control two (or more than two) BBERFs at the same time. (The BBERF is not classified into the Primary BBERF and Non-Primary BBER in this scenario.) When the UE decides to disconnect from an access network, the BBERF in the access network needs to inform the hPCRF, and the BBERF will terminate the Gxx session in the visited network, thereby informing the hPCRF to delete the related information of the BBERF. However, in the current multiple access scenarios, schemes related to these processing processes have not been involved either.

SUMMARY OF THE INVENTION

In view of this, the main object of the present invention is to provide a method for deleting redundant information of a home policy and charging rule function, which can make the redundancy of home network resources to be eliminated when the gateway control session in the visited network is terminated in a roaming scenario, thereby saving the home network resources.

Another object of the present invention is to provide a system for deleting redundant information of a home policy and charging rule function, which can make the redundancy of home network resources to be eliminated when the gateway control session in the visited network is terminated in a roaming scenario, thereby saving the home network resources.

To achieve the foregoing objects, the technical scheme of the present invention is implemented as follows.

A method for deleting redundant information of a home policy and charging rule function comprises:

a Bearer Binding and Event Report Function (BBERF) in a visited network indicating gateway control session termination to the home Policy and Charging Rule Function (PCRF) through a visited PCRF; and said home PCRF deleting policy control information related to said BBERF in the visited network.

Before the step of the BBERF in the visited network indicating the gateway control session termination to the home PCRF through the visited PCRF, the method further comprises: said BBERF in the visited network receiving a termination session triggering which is used for determining to terminate a gateway control session between the BBERF in the visited network and said visited PCRF.

Said termination session triggering of the gateway control session comes from User Equipment (UE), or a Packet Data Network Gateway (P-GW), or said BBERF in the visited network self.

The step of the BBERF in the visited network indicating gateway control session termination to the home PCRF through the visited PCRF specifically comprises: said visited PCRF sending an S9 session modification indication message to the home PCRF to indicate that said gateway control session terminates after receiving a gateway control session termination request message sent by the BBERF in the visited network.

After said visited PCRF receiving the gateway control session termination request message sent by the BBERF in the visited network and before sending the S9 session modification indication message to said home PCRF, the method further comprises:

said visited PCRF determining that said BBERF in the visited network is a non primary BBERF.

Said S9 session modification indication message includes an address of said BBERF in the visited network; the address of the BBERF in the visited network is located in an S9 session level, or a subsession level of an S9 session.

Said S9 session modification indication message includes a session termination indication, and said session termination indication indicates that said gateway control session terminates;

said session termination indication is located in an S9 session level, or a subsession level of an S9 session.

Said policy control information related to the BBERF in the visited network includes: a Quality of Service (QoS) rule and/or an event trigger.

A system for deleting redundant information of a home policy and charging rule function, at least comprises a BBERF in a visited network, a home PCRF, and a visited PCRF, wherein the BBERF in the visited network is used to indicate gateway control session termination to the home PCRF through the visited PCRF; the home PCRF is used to delete policy control information related to said BBERF in the visited network.

The BBERF in the visited network is specifically used to make a request for the gateway control session termination from said visited PCRF;

said visited PCRF is specifically used to receive a gateway control session termination request from said BBERF in the visited network, and send an S9 session modification request to the home PCRF to indicate that said gateway control session terminates;

the home PCRF is specifically used to receive the S9 session modification request from the visited PCRF, and delete the policy control information related to said BBERF in the visited network.

Said visited PCRF is further configured to determine that said BBERF in the visited network is a non primary BBERF.

Said BBERF in the visited network is further configured to receive a termination session triggering which is used for determining to terminate a gateway control session between said BBERF in the visited network and said visited PCRF.

Said termination session triggering comes from User Equipment (UE), or a Packet Data Network Gateway (P-GW), or said BBERF in the visited network self.

A visited Policy and Charging Rule Function (PCRF) comprises a receiving module and a sending module, wherein the receiving module is configured to: receive an indication for indicating that gateway control session terminates sent from a Bearer Binding and Event Report Function (BBERF) in a visited network;

the sending module is configured to: send the indication for indicating that gateway control session terminates to a home PCRF, so that the home PCRF deletes policy control information related to said BBERF in the visited network.

Said receiving module is further configured to: receive a gateway control session termination request from said BBERF in the visited network for making a request for the gateway control session termination;

the sending module is further configured to: send an S9 session modification request to the home PCRF to indicate that said gateway control session terminates after receiving the gateway control session termination request.

The visited PCRF further comprises a determination module, wherein said determination module is configured to: determine that said BBERF in the visited network is a non primary BBERF, and then trigger the sending module;

said sending module is further configured to: send an S9 session modification indication message to the home PCRF to indicate that said gateway control session terminates after being triggered by the determination module.

Said S9 session modification indication message includes an address of said BBERF in the visited network;

the address of the BBERF in the visited network is located in an S9 session level, or a subsession level of an S9 session.

Said S9 session modification indication message includes a session termination indication, and said session termination indication indicates that said gateway control session terminates;

said session termination indication is located in an S9 session level, or a subsession level of an S9 session.

It can be seen from the above technical Scheme provided in the present invention that the BBERF in the visited network indicates gateway control session termination to the home PCRF through the visited PCRF after receiving a termination session triggering which is used for determining to terminate a gateway control session between the BBERF in the visited network and the visited PCRF, and the home PCRF deletes the policy control information related to the BBERF in the visited network. With the method of the invention, when the UE is in a roaming scenario of the home routed or local breakout, and in the process of the occurrence of the BBERF relocation, or after performing UE inter-system pre-registration or in a multiple access situation, and when the gateway control session in the visited network terminates, the invalid session information in the home PCRF is cleared in time, which eliminates the redundancy of the home network resources and saves the home network resources.

PREFERRED EMBODIMENTS OF THE PRESENT INVENTION

Figure 7:
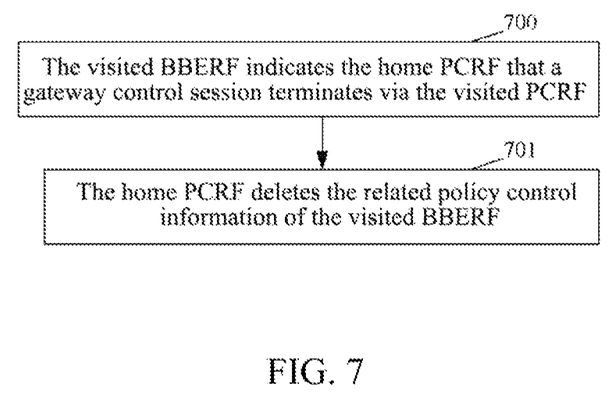
FIG. 7 is a flow chart of the method for deleting redundant information of the home policy and charging rule function according to the present invention.

FIG. 7 is a flow chart of the method for deleting redundant information of the home policy and charging rule function according to the present invention, and as shown in FIG. 7, following steps are comprised.

Step 700: the BBERF in the visited network indicates gateway control session termination to the home PCRF through the visited PCRF.

The BBERF in the visited network indicates gateway control session termination to the home PCRF through the visited PCRF after receiving the termination session triggering which is used for determining to terminate a gateway control session between the BBERF in the visited network with the vPCRF. The termination session triggering may come from the UE, or the P-GW, or the BBERF in the visited network itself.

The triggering condition includes a plurality of situations: for a scenario of the UE performing handover, the termination session triggering is that: the gateway in which the BBERF is located receives a binding withdrawal message sent by the P-GW in which the PCEF is located; for a scenario of the UE performing inter-system pre-registration, the termination session triggering is that: the gateway in which the BBERF is located receives a cancellation pre-registration message sent by the UE; for a multiple access scenario, the termination session triggering is that: the gateway in which the BBERF is located receives a disconnection PDN connection request message initiated by the UE and so on; for each of the above scenario, the BBERF also may decide to terminate the session according to its own situation.

The vPCRF sends an S9 session modification indication message to the hPCRF after receiving a gateway control session termination request message sent by the BBERF in the visited network, and the S9 session modification indication message includes an address of said BBERF in the visited network and a session termination indication, wherein the address of the BBERF in the visited network and the session termination indication can locate at the S9 session level (i.e. the command level), or the sub-session level of the S9 session.

It should be noted that if the system defaults that the session level of the S9 session modification indication message sent by the vPCRF just includes the address of the BBERF in the visited network without including any other information so as to implicitly inform the hPCRF that the gateway control session in the visited network of the BBERF in the visited network terminates and the information related to the BBERF in the visited network should be deleted, then the S9 session modification indication message sent by the vPCRF to the hPCRF can omit the session termination indication.

In a scenario of BBERF relocation or a scenario of the UE inter-system pre-registration, if only one Non-Primary BBERF exists and the Non-Primary BBERF determines to terminate the gateway control session between the Non-Primary BBERF and the visited PCRF, the address of the BBERF can be not included.

Step 701: the home PCRF deletes the policy control information related to the BBERF in the visited network.

The hPCRF receives the S9 session modification indication message from the vPCRF, and then deletes said policy control information, including the QoS rules and/or event triggers, related to the BBERF in the visited network.

Regarding to the method as shown in FIG. 7, the present invention further provides a system for deleting redundant information of the home policy and charging rule function, which at least comprises a BBERF in a visited network, a home PCRF and a visited PCRF, wherein the BBERF in a visited network is used to indicate gateway control session termination to the home PCRF through the visited PCRF;

the home PCRF is used to delete the policy control information related to the BBERF in the visited network.

The BBERF in the visited network is specifically used to make a request for gateway control session termination from the visited PCRF;

the visited PCRF is specifically used to receive the gateway control session termination request from the BBERF in the visited network, and send an S9 session modification request to the home PCRF to indicate said gateway control session termination;

the home PCRF is specifically used to receive the S9 session modification request from the visited PCRF, and delete the information related to said BBERF in the visited network.

Said BBERF in the visited network is further used to receive a termination session triggering which is used for determining to terminate the gateway control session between the BBERF in the visited network with the visited PCRF.

Said termination session triggering comes from the User Equipment (UE), or the Packet Data Network Gateway (P-GW), or the BBERF in the visited network itself.

Regarding to the method as shown in FIG. 7, the present invention further provides a visited PCRF, which comprises a receiving module and a sending module, wherein the receiving module can be configured to: receive an indication for indicating that gateway control session terminates sent from a BBERF in a visited network, and trigger the sending module;

the sending module can be configured to: send the indication for indicating that gateway control session terminates to a home PCRF, so that the home PCRF deletes policy control information related to said BBERF in the visited network.

In addition, said receiving module can be further configured to: receive a gateway control session termination request from said BBERF in the visited network for making a request for the gateway control session termination;

the sending module can be further configured to: send an S9 session modification request to the home PCRF to indicate that said gateway control session terminates faster receiving the gateway control session termination request.

The visited PCRF can further comprises a determination module, wherein said determination module can be configured to: determine that said BBERF in the visited network is a on primary BBERF, and then trigger the sending module;

said sending module can be further configured to: send a S9 session modification indication message to the home PCRF to indicate that said gateway control session terminates after being triggered by the determination module.

In addition, said S9 session modification indication message includes an address of said BBERF in the visited network; and the address of the BBERF in the visited network is located in an S9 session level, or a subsession level of an S9 session.

In addition, said S9 session modification indication message includes message includes a session termination indication, and said session termination indication indicates that said gateway control session terminates; and said session termination indication is located in an S9 session level, or a subsession level of an S9 session.

Figure 8:
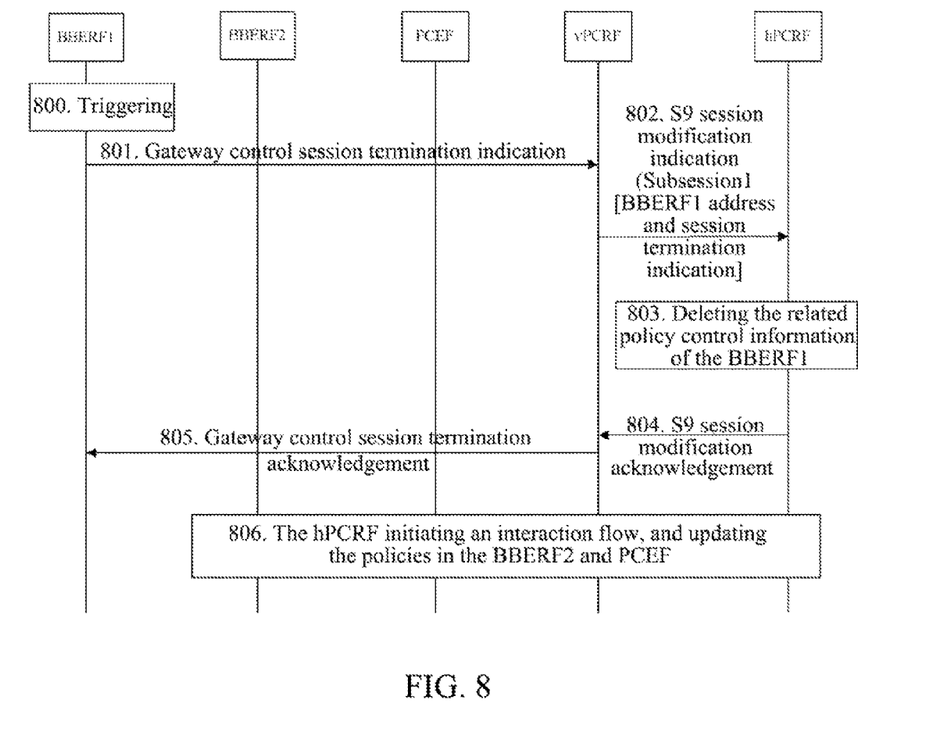
FIG. 8 is a flow chart of the example 1 for deleting redundant information of the home policy and charging rule function according to the present invention.

FIG. 8 is a flow chart for deleting redundant information of the home policy and charging rule function according to an example of the present invention, in the example, the UE can be implemented in a roaming scenario of the home routed or local breakout and in the process of BBERF relocation, after UE inter-system pre-registration or in a multiple access situation. It is assumed that the hPCRF simultaneously controls two BBERFs (the BBERF1 and BBERF2 as shown in FIG.

8); and it is assumed that the UE accessing the EPS through the access networks in which the BBERF1 and BBERF2 are located both adopts a PMIPv6 protocol, or accessing the EPS through the access network in which the BBERF1 is located adopts a PMIPv6 protocol and accessing the EPS through the access network in which the BBERF2 is located adopts a DSMIPv6 protocol.

As shown in FIG. 8, the following steps are comprised:

Step 800: the BBERF1 receives a triggering and determines to terminate the gateway control session between the BBERF1 with the vPCRF, wherein the BEERF1 is a BBERF in the visited network.

In this step, the triggering for terminating the gateway control session between the BBERF1 and the vPCRF may come from the UE, or the P-GW, or the BBERF1 itself.

Step 801: the BBERF1 sends a gateway control session termination request message to the vPCRF.

Step 802: for a scenario of BBERF relocation or an UE inter-system pre-registration, the vPCRF determines that the BBERF1 is a Non-Primary BBERF. For a multiple access scenario, the vPCRF is not required to make such determination. When finding out the S9 session and the subsession of the S9 session corresponding to the gateway control session, the vPCRF sends an S9 session modification indication message to the hPCRF and makes a request for modifying the subsession, and the S9 session modification indication message includes a subsession that includes an address of the BBERF1 and a session termination indication, wherein the session termination indication indicates that the gateway control session in the visited network terminates.

Step 803: the hPCRF deletes the policy control information related to the BBERF1 according to the address of the BBERF1 and session termination indication. The policy control information related to the BBERF1 refers to the QoS rules and/or event triggers made by the hPCRF for the BBERF1. If only QoS rules exist, then the QoS rules are deleted; if only event triggers exist, then the event triggers are deleted; if both the QoS rules and event triggers exist, then the both are deleted at the same time.

Step 804: the hPCRF returns an S9 session modification acknowledgement message to the vPCRF.

Step 805: the vPCRF returns a gateway control session termination acknowledgement message to the BBERF1.

Step 806: optionally, the PCRF initiates an interaction procedure and updates the policies in the BBERF2 and PCEF.

The vPCRF can also only include the address of the BBERF1 in Subsession1 without including any other information so as to implicitly inform the hPCRF of gateway control session in the visited network of the BBERF1 terminating, and the hPCRF deletes the policy control information related to the BBERF 1.

Figure 9:
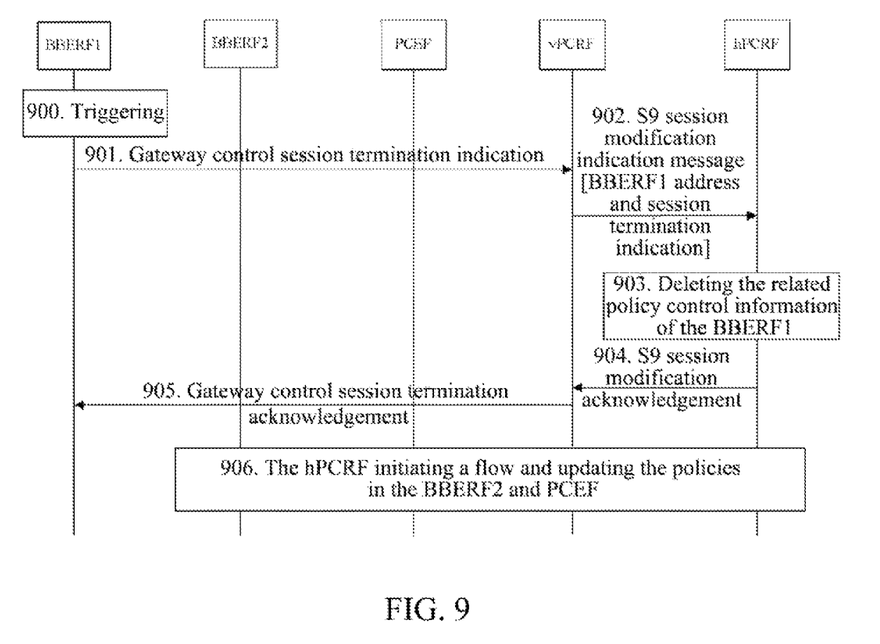
FIG. 9 is a flow chart of the example 2 for deleting redundant information of the home policy and charging rule function according to the present invention.

FIG. 9 is a flow chart for deleting redundant information of the home policy and charging rule function according to an example of the present invention, in the example, the UE can be implemented in a roaming scenario of the home routed or local breakout and in the process of BBERF relocation, after UE inter-system pre-registration or in a multiple access situation. It is assumed that the hPCRF simultaneously controls two BBERFs (the BBERF1 and BBERF2 as shown in FIG. 9); and it is assumed that the UE accessing the EPS through the access networks in which the BBERF1 and BBERF2 are located both adopts a PMIPv6 protocol, or accessing the EPS through the access network in which the BBERF1 is located adopts a PMIPv6 protocol and accessing the EPS through the access network in which the BBERF2 is located adopts a DSMIPv6 protocol.

As shown in FIG. 9, the following steps are comprised.

Step 900: the BBERF1 receives a triggering and determines to terminate the gateway control session between the BBERF1 with the vPCRF, wherein the BEERF1 is a BBERF in the visited network.

In this step, the triggering for terminating the gateway control session between the BBERF1 and the vPCRF may come from the UE, or the P-GW, or the BBERF1 itself.

Step 901: the BBERF1 sends a gateway control session termination request message to the vPCRF.

Step 902: for a scenario of BBERF relocation or UE inter-system pre-registration, the vPCRF determines that the BBERF1 is a Non-Primary BBERF. For a multiple access scenario, the vPCRF is not required to make such a determination. The vPCRF finds out the S9 session corresponding to the gateway control session. The vPCRF sends an S9 session modification indication message to the hPCRF, and the S9 session modification indication message includes an address of the BBERF1 and a session termination indication. The address of the BBERF1 and the session termination indication are included in the S9 session level (i.e. the command level), wherein the session termination indication indicates that the gateway control session in the visited network terminates.

Step 903: the hPCRF deletes the policy control information related to the BBERF1 according to the address of the BBERF1 and session termination indication. The policy control information related to the BBERF1 refers to the QoS rules and/or event triggers made by the hPCRF for the BBERF1. If only QoS rules exist, then the QoS rules are deleted; if only event triggers exist, then the event triggers are deleted; if both the QoS rules and event triggers exist, then the both are deleted at the same time.

Step 904: the hPCRF returns an S9 session modification acknowledgement message to the vPCRF.

Step 905: the vPCRF returns a gateway control session termination acknowledgement message to the BBERF1.

Step 906: optionally, the PCRF initiates an interaction procedure and updates the policies in the BBERF2 and PCEF.

The vPCRF can also only include the BBERF1 address in the session level of the S9 session modification message without including any other information so as to implicitly inform the hPCRF of gateway control session in the visited network of the BBERF 1 terminating, and the hPCRF deletes the policy control information related the BBERF1.

The method of the present invention also adapts to a roaming scenario of the local breakout, the UE is handover from 3GPP access to trusted non 3GPP access or converse handover or performs multiple access with trusted non 3GPP access and 3GPP access, wherein when it is the 3GPP access, the scenario is that a GTP protocol is adopted between the S-GW and P-GW. In this scenario, although the hPCRF only needs to control one BBERF (located in the trusted non 3GPP access network), the BBERF also needs to adopt the present invention (the BBERF is a Non-Primary BBERF at the moment) to terminate the gateway control session in the visited network after finishing the handover. If a DSMIPv6 protocol is adopted when the access of the UE is based on accessing the trusted non 3GPP access gateway, then the vPCRF sends an S9 session modification request message to the hPCRF, and the message includes a session termination indication which is included in the S9 session level (i.e. the command level). Since there is only one BBERF, the address of the BBERF can be optionally included. The hPCRF deletes the information related to the BBERF according to the session termination indication. If a PMIPv6 protocol is adopted when the access of the UE is based on accessing the trusted non 3GPP access gateway, then the vPCRF sends an S9 session modification request message to the hPCRF and requests a corresponding subsession, and the subsession includes a session termination indication. Similarly, since there is only one BBERF, the included address of the BBERF can be optional. The hPCRF deletes the policy control information related to the BBERF according to the session termination indication.

The above description is just the preferred examples of the present invention, which is not used to limit the present invention. All the modifications, equivalent substitutions, and improvements, etc. within the spirit and principle of the present invention shall all fall into the protection scope of the present invention.

Industrial Applicability

With the method of the invention, when the UE is in a roaming scenario of the home routed or local breakout, in the process of the occurrence of the BBERF relocation, or after performing UE inter-system pre-registration or in a multiple access situation, and when the gateway control session in the visited network terminates, the invalid session information in the home PCRF is cleared in time, which eliminates the redundancy of the home network resources and saves the home network resources.

What is claimed is:

1. A method for deleting redundant information of a home policy and charging rule function, comprising:
 a Bearer Binding and Event Report Function (BBERF) in a visited network indicating gateway control session termination to the home Policy and Charging Rule Function (PCRF) through a visited PCRF; and
 said home PCRF deleting policy control information which is related to said BBERF in the visited network and stored in said home PCRF,
 wherein the step of the BBERF in the visited network indicating gateway control session termination to the home PCRF through the visited PCRF comprises:
 said visited PCRF, after receiving a gateway control session termination request message sent by the BBERF in the visited network, sending an S9 session modification indication message to the home PCRF to make a request for modifying an S9 subsession corresponding to a gateway control session between the BBERF in the visited network and said visited PCRF and indicate that said gateway control session terminates, and
 wherein
 said S9 session modification indication message includes an address of said BBERF in the visited network; and
 the address of the BBERF in the visited network is located in an S9 session level, or a subsession level of an S9 session.

2. The method according to claim 1, before the step of the BBERF in the visited network indicating the gateway control session termination to the home PCRF through the visited PCRF, further comprising: said BBERF in the visited network receiving a termination session triggering which is used for determining to terminate the gateway control session between the BBERF in the visited network and said visited PCRF.

3. The method according to claim 2, wherein said termination session triggering of the gateway control session comes from a User Equipment (UE), or a Packet Data Network Gateway (P-GW), or said BBERF in the visited network self.

4. The method according to claim 1, before the step of the visited PCRF sending the S9 session modification indication message to said home PCRF, further comprising:
 said visited PCRF determining that said BBERF in the visited network is a non primary BBERF.

5. The method according to claim 1, wherein
 said S9 session modification indication message includes a session termination indication, and said session termination indication indicates that said gateway control session terminates;
 said session termination indication is located in an S9 session level, or a subsession level of an S9 session.

6. The method according to claim 1, wherein said policy control information related to the BBERF in the visited network includes: a Quality of Service (QoS) rule and/or an event trigger.

7. A system for deleting redundant information of a home policy and charging rule function, and the system at least comprising a BBERF in a visited network, a home PCRF, and a visited PCRF, wherein
 the BBERF in the visited network is configured to:
 send a request for gateway control session termination to said visited PCRF, and
 indicate the gateway control session termination to the home PCRF through the visited PCRF;
 said visited PCRF is configured to:
 receive the request for gateway control session termination from said BBERF in the visited network, and
 send an S9 session modification request to the home PCRF to make a request for modifying an S9 subsession corresponding to a gateway control session between said BBERF in the visited network and said visited PCRF and indicate that said gateway control session terminates; and
 the home PCRF is configured to:
 receive the S9 session modification request from the visited PCRF, and
 delete policy control information which is related to said BBERF in the visited network and stored in said home PCRF,
 wherein
 said S9 session modification request includes an address of said BBERF in the visited network; and
 the address of the BBERF in the visited network is located in an S9 session level, or a subsession level of an S9 session.

8. The system according to claim 7, wherein said visited PCRF is further configured to determine that said BBERF in the visited network is a non primary BBERF.

9. The system according to claim 7, wherein said BBERF in the visited network is further configured to receive a termination session triggering which is used for determining to terminate the gateway control session between said BBERF in the visited network and said visited PCRF.

10. The system according to claim 9, wherein said termination session triggering comes from a User Equipment (UE), or a Packet Data Network Gateway (P-GW), or said BBERF in the visited network self.

11. A visited Policy and Charging Rule Function (PCRF) comprising a receiving module and a sending module, wherein
 the receiving module is configured to: receive an indication for indicating that gateway control session terminates sent from a Bearer Binding and Event Report Function (BBERF) in a visited network;
 the sending module is configured to: send the indication for indicating that gateway control session terminates to a home PCRF, so that the home PCRF deletes policy control information which is related to said BBERF in the visited network and stored in said home PCRF, wherein
said receiving module is further configured to: receive a gateway control session termination request from said BBERF in the visited network for making a request for the gateway control session termination;
said sending module is further configured to: send an S9 session modification request to the home PCRF to make a request for modifying an S9 subsession corresponding to the gateway control session and indicate that said gateway control session terminates, after receiving the gateway control session termination request, and
wherein
said S9 session modification request includes an address of said BBERF in the visited network;
the address of the BBERF in the visited network is located in an S9 session level, or a subsession level of an S9 session.

12. The visited PCRF according to claim 11 further comprising a determination module, wherein
said determination module is configured to: determine that said BBERF in the visited network is a non primary BBERF;
said sending module is further configured to: send the S9 session modification indication message to the home PCRF to indicate that said gateway control session terminates after being triggered by the determination module.

13. The visited PCRF according to claim 12, wherein
said S9 session modification indication message includes a session termination indication, and said session termination indication indicates that said gateway control session terminates;
said session termination indication is located in an S9 session level, or a subsession level of an S9 session.

* * * * *